United States Patent Office 3,518,487
Patented June 30, 1970

3,518,487
PHOTOFLASHING CIRCUIT DEVICE
Masashi Tanaka, Osamu Nomura, and Hiyutaro Kawamura, Yokohama-shi, and Takayuki Iida, Tokyo, Japan, assignors to Tokyo Shibaura Electric Co., Ltd., Kawasaki-shi, Japan, a corporation of Japan
Filed Jan. 24, 1968, Ser. No. 700,247
Claims priority, application Japan, Jan. 31, 1967, 42/6,221, 42/6,222
Int. Cl. H05b 37/00
U.S. Cl. 315—232      10 Claims

ABSTRACT OF THE DISCLOSURE

A plurality of flash lamps are connected in parallel through a synchronizing contact across a capacitor charged from a DC source. The charge stored in said capacitor discharges through one of flash lamps by the momentary closure of the synchronizing contact interlocked with a shutter of a camera and current limiting elements are interposed between adjacent flash lamps to control currents flowing through succeeding flash lamps in response to the impedance variation of a preceding flash lamp before and after ignition thereof when said contact is closed, whereby successive ignition of a plurality of flash lamps is completed without use of a mechanical change-over switch.

In recent years, for the purpose of speeding up and simplifying photographic operations, it has been proposed to mount a magazine accommodating a plurality of flash lamps in a camera whereby to enable successive flashing the flash lamps each time the shutter button of the camera is depressed.

A change-over switch interlocked with the self-cocking lever and having terminal contacts for a plurality of flash lamps are arranged such that their connections to a source of electric supply are switched successively in accordance with the cocking movement of said cocking lever. However, the construction of the change-over switch utilized in such a mechanism is complicated so that it is very difficult to build the change-over switch in the body of a relatively small size camera. Also, there is a possibility of failure of ignition due to increasing contact resistance of said change-over switch.

It is therefore an object of this invention to provide an improved photoflashing circuit device which can sequentially ignite a plurality of flash lamps without the use of a mechanical change-over switch and which can be manufactured sufficiently small to be built into a small size camera.

Another object of this invention is to provide a photoflashing circuit device for sequentially igniting a plurality of flash lamps having improved vibration and shock resistance as well as long life and excellent reliability.

According to this invention the above and other objects can be attained by connecting in parallel a plurality of flash lamps across a source through a synchronizing contact of a camera and by providing a distribution circuit wherein current limiting elements are inserted between adjacent flash lamps except the first flash lamp or by providing a coupling switching circuit between adjacent flash lamps which is controlled to become conductive in accordance with the impedance variation of the preceeding flash lamp before and after ignition thereof.

The applicant has filed a copending U.S. patent application Ser. No. 565,225 now Pat. No. 3,454,756 relating to an ignition control device for flash lamps capable of igniting them successively.

The invention can be more fully understood from the following detailed description taken in connection with the accompanying drawings in which.

Figure 1:
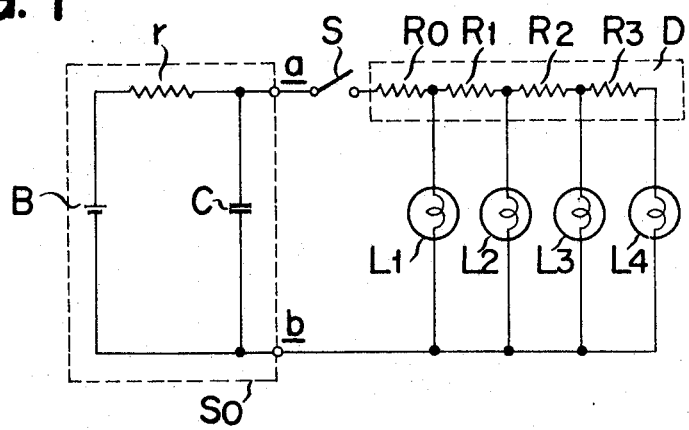
FIG. 1 shows a circuit diagram of one type of flash lamp ignition circuit.

Referring now to FIG. 1 of the accompanying drawings, an electric source section $S_0$ is comprised by a DC source B having an output voltage of from 18 to 24.75 volts and a capacitor having a capacity of 137 $\mu$f. connected across the source through a charging resistor $r$ of 1000 ohms. A plurality of (for example four) flash lamps $L_1$, $L_2$, $L_3$ and $L_4$ are connected across output terminals $a$ and $b$ of the source section $S_0$ through a camera synchronizing contact S. The contact S is shown schematically in the drawings and is a part of the camera itself. Virtually every camera has such a flash contact and a more detailed description thereof is believed to be unnecessary. Flash lamps $L_1$, $L_2$, $L_3$ and $L_4$ may have different current sensitivities, for example 0.8 a., 0.6 a., 0.5 a. and 0.5 a. respectively. A distribution circuit D is connected between the switch S and flash lamps. The distribution circuit D comprises a current limiting element, for example a resistor $R_0$ interposed between the contact S and the first flash lamp $L_1$, a resistor $R_1$ having a resistance of 2 ohms inserted between the first and the second flash lamps $L_1$ and $L_2$, a resistor $R_2$ (3 ohms) connected between the second and the third flash lamps $L_2$ and $L_3$ and a resistor $R_3$ (4 ohms) connected between the third and the fourth flash lamps $L_3$ and $L_4$. If desired, the first resistor $R_0$ may be omitted.

The operation of the circuit is as follows:

The capacitor C of the source section $S_0$ is charged from DC source B through the charging resistor $r$ with electric energy sufficient to ignite a flash lamp. Upon momentary closure of the contact S upon depression of the camera shutter release, the charge stored in the capacitor C will be discharged through the first flash lamp $L_1$ through the contact S and the resistor $R_0$ of the distributing circuit, thus igniting flash lamp $L_1$. At this time currents flowing through the second to fourth flash lamps $L_2$ to $L_4$ are limited by resistors $R_1$ to $R_3$ of the distributing circuit D to values less than those required to ignite them thus preventing these succeeding lamps from flashing. When the first flash lamp $L_1$ ignites and when its filament is burnt out by the heat of ignition, the resistance across the first flash lamp $L_1$, increases to infinity. After discharging of the capacitor, recharging thereof takes place rapidly through the resistor $r$. Upon the second momentary closure of the contact S, the charge of the capacitor C will now discharge through the second flash lamp $L_2$ via the contact S and the resistors $R_0$ and $R_1$ thus igniting flash lamp $L_2$. In the same manner, succeeding flash lamps $L_3$ and $L_4$ can be ignited sequentially.

Figure 2:
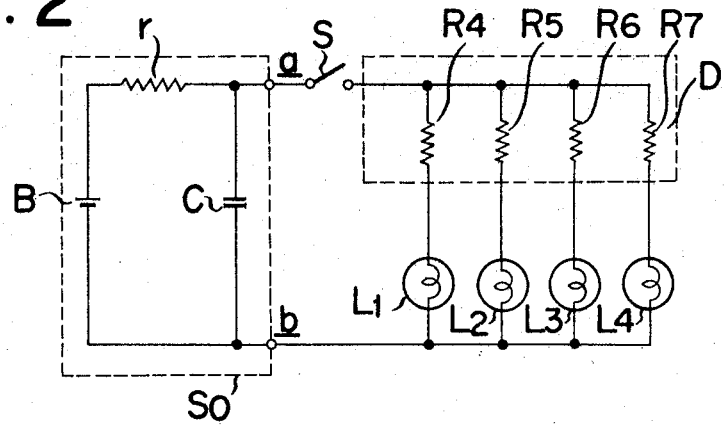
FIGS. 2 and 3 are circuit diagrams of other flash lamp ignition circuits.

FIG. 2 shows a modification of the circuit of FIG. 1. Components of FIG. 2 corresponding to those of FIG. 1 are designated by the same reference characters so that their description is believed unnecessary. The distribution circuit D shown in FIG. 2 is comprised by resistors $R_4$, $R_5$, $R_6$ and $R_7$ respectively connected in series with respective flash lamps $L_1$, $L_2$, $L_3$ and $L_4$. The values of these resistors are predetermined to satisfy a relation $R_4 < R_5 < R_6 < R_7$. Consequently, upon momentary closure of the contact S, the first flash lamp $L_1$ will first be ignited which is connected in series with the resistor $R_4$ of the minimum resistance. At this time currents flowing through succeeding flash lamps are limited to values insufficient to ignite them due to higher resistance values of series resistors.

In this manner a number of parallel connected flash lamps are ignited sequentially by the successive operations of the contact S without use of a mechanical change-over switch.

Figure 3:
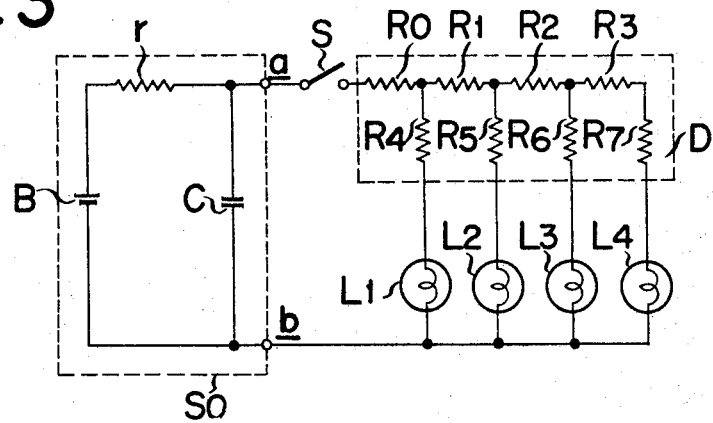

The modification shown in FIG. 3 employs a distribution circuit corresponding to the combination of those shown in FIGS. 1 and 2. More particularly, distribution circuit D comprises a number of serially connected current limiting elements or resistors $R_0$, $R_1$, $R_2$ and $R_3$ and resistors $R_4$ through $R_7$ each connected in series with a flash lamp, respectively. As the embodiment shown in FIG. 3 operates in the same manner as those shown in FIGS. 1 and 2, the description of its operation is believed unnecessary.

Figure 4:
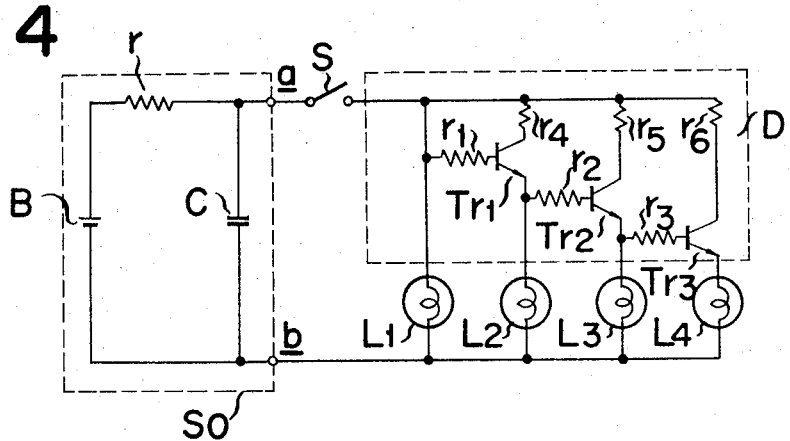
FIGS. 4 through 7 are circuit diagrams of embodiments of this invention having contactless switching means responsive to impedance variations.

An embodiment of the present invention having contactless switching means responsive to impedance variations after ignition of a lamp is shown in FIG. 4, the distribution circuit D thereof comprising NPN transistors $Tr_1$, $Tr_2$ and $Tr_3$ which are respectively connected between adjacent flash lamps. More specifically, emitter electrodes of respective transistors $Tr_1$, $Tr_2$ and $Tr_3$ are respectively connected to one terminal of flash lamps while collector electrodes are connected to output terminal $a$ of source section through the schematically shown synchronizing contact S and resistors $r_4$, $r_5$ and $r_6$ respectively. It should be clear that contact S could be included in the camera itself and be coupled to the shutter, or contact S could be coupled to the contacts within the camera. The other terminal of said flash lamps are respectively connected to the other terminal $b$ of source section. Base electrodes of the transistors are connected to one terminal of preceding flash lamps respectively through resistors $r_1$, $r_2$ and $r_3$.

The embodiment shown in FIG. 4 operates as follows:

Upon momentary closure of the contact S the charge stored in the capacitor C will discharge only through the first flash lamp $L_1$. Until the flash lamp $L_1$ ignites, as the base-emitter electrodes of the transistor $Tr_1$ are short circuited through the flash lamp $L_1$ the path through the emitter-collector electrodes is non-conductive, thus preventing current from flowing through the second flash lamp $L_2$. Consequently, the discharge current flows only through the first flash lamp $L_1$ to ignite it. When flash lamp has been flashed, the filament thereof is burnt out to open the short circuit across the base-emitter electrodes of the transistor $Tr_1$. As a result, upon the next momentary closure of contact S, the second flash lamp $L_2$ will be ignited. However, until the second flash lamp $L_2$ ignites to burn out its filament to open the short circuit across the base-emitter electrodes of transistor $Tr_2$ in the circuit with the third flash lamp $L_3$, this lamp and the fourth flash lamp $L_4$ will not be ignited.

In this manner, by momentary closing the contact S after the filament of a preceding flash lamp has burnt out to open the short circuit across the base-emitter electrodes of a transistor connected in series with a succeeding flash lamp, succeeding flash lamps are sequentially ignited.

Figure 5:
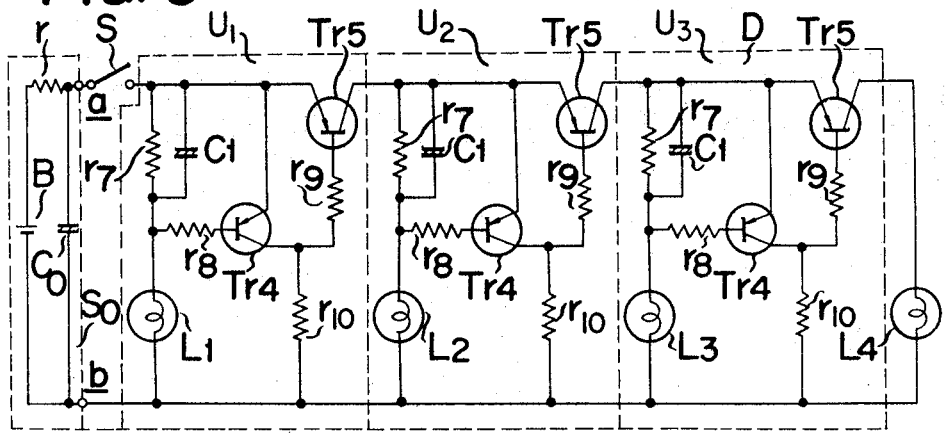

Turning now to the distribution circuit D shown in FIG. 5, a resistor $r_7$ is inserted in a branch including a flash lamp $L_1$. A capacitor $C_1$ (for example 30 μf.) is connected in parallel with the resistor $r_7$ (5 ohms). A series circuit including a first PNP transistor $Tr_4$ and a resistor $r_{10}$ is connected in parallel with the branch consisting of a series circuit of the first flash lamp $L_1$ and a parallel circuit of resistor $r_7$ and capacitor $C_1$. More particularly the emitter electrode of transistor $Tr_4$ is connected to the junction of contact S and one terminal of resistor $r_7$, the base electrode to the junction between the resistor $r_7$ and the flash lamp $L_1$ through a resistor $r_8$ (for example 100 ohms), while the collector electrode to the junction of flash lamp $L_1$ and output terminal $b$ of source section $S_0$ through the resistor $r_{10}$ (60 ohms). Further the collector electrode of the first transistor $Tr_4$ is connected to the base electrode of the second PNP transistor $Tr_5$ via a resistor $r_9$ (60 ohms). The emitter electrode of second transistor $Tr_5$ is connected to the emitter electrode of the first transistor $Tr_4$. Thus a flash lamp $L_1$, transistors $Tr_4$ and $Tr_5$, resistors $r_7$, $r_8$, $r_9$ and $r_{10}$ and a capacitor $C_1$ constitute a unit circuit $U_1$. A plurality of such unit circuit $U_1$, $U_2$ and $U_3$ are connected in cascade, i.e. one terminal of resistor $r_7$ of the unit circuit $U_2$ is connected to the collector of transistor $Tr_5$ of the unit circuit $U_1$ and the unit circuit $U_3$ is connected to the unit circuit $U_2$ as well as between the unit circuit $U_1$ and $U_2$, but is connected to last unit circuit $U_3$ is flash lamp $L_4$ only.

The embodiment shown in FIG. 5 operates as follows: At first the contact S is momentarily closed. Then the charge stored in the capacitor $C_0$ will discharge through the branch including the first flash lamp $L_1$ and the first transistor $Tr_4$. Since the resistance of the branch including the first transistor $Tr_4$ is selected to be larger than that of the branch including the flash lamp $L_1$ almost all of the discharge current flows through the flash lamp $L_1$ to ignite it. By the momentary closure of the contact S, current also flows through the capacitor $C_1$ to charge it. When flash lamp $L_1$ ignites, its filament is burnt out by the heat of ignition. Although not shown in the drawing, it is to be understood that the contact S is interlocked with the shutter of a camera so that it is released concurrently with the operation of the shutter. Even after burning out of the filament of the first flash lamp $L_1$, a potential difference will be maintained across the emitter and base electrodes of the first transistor $Tr_4$ as long as the discharge current of capacitor $C_1$ flows through the resistor $r_7$, thus maintaining the first transistor $Tr_4$ in its conductive state. As a consequence the emitter and base electrodes of the second transistor $Tr_5$ are maintained at the same potential whereby no current flows through the second transistor $Tr_5$. After burning out the filament of the first flash lamp $L_1$ and when the discharge of the capacitor $C_1$ is completed, the potential difference across the emitter and base electrodes of the first transistor $Tr_4$ will be reduced to zero thus bringing it to off state. Consequently, the base electrode of the second transistor $Tr_5$ will be connected to the negative terminal or output terminal $b$ of source section $S_0$ through resistors $r_9$ and $r_{10}$. Thereby this transistor $Tr_5$ is prepared for conduction. Under this state transistor $Tr_5$ is effectively a short circuit and closure of the contact S causes flash lamp $L_2$ to flash. In the same manner, the third and fourth flash lamps are sequentially ignited.

Figure 6:
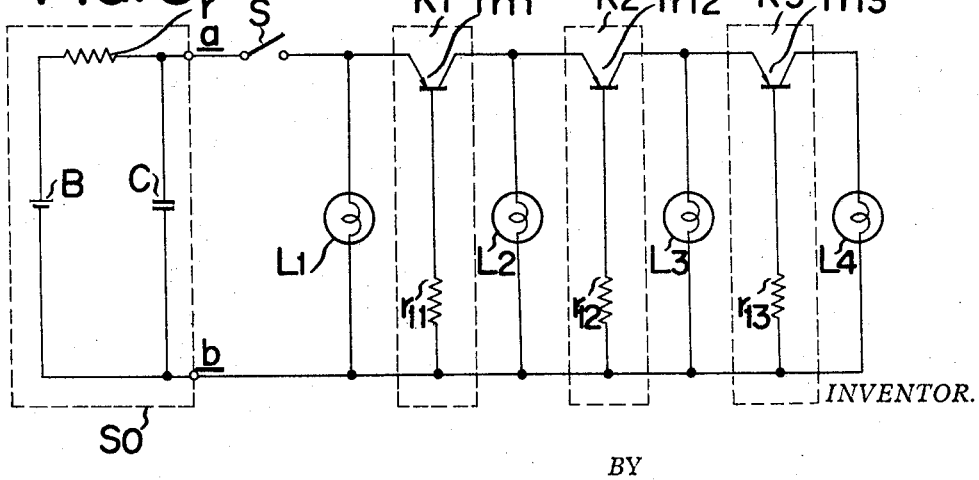

In the embodiment shown in FIG. 6, a plurality of (for example four) flash lamps $L_1$, $L_2$, $L_3$ and $L_4$ are connected in parallel through a contact S across output terminals $a$, $b$ of a source section $S_0$ including a DC source B and capacitor C connected thereto through a resistor $r$. Coupling circuits $K_1$, $K_2$ and $K_3$ are connected between each pair of adjacent flash lamps as shown in the drawings. Thus, emitter electrodes of PNP transistors $Tr_{11}$, $Tr_{12}$ and $Tr_{13}$ are respectively connected to one side terminal of preceding flash lamps $L_1$, $L_2$ and $L_3$ while collector electrodes are respectively connected to side terminals of succeeding flash lamps $L_2$, $L_3$ and $L_4$. Base electrodes of respective transistors $Tr_{11}$, $Tr_{12}$ and $Tr_{13}$ are connected to the other ends of flash lamps $L_1$, $L_2$ and $L_3$ respectively through resistors $r_{11}$, $r_{12}$ and $r_{13}$.

The operation of the embodiment shown in FIG. 6 is as follows:

When the contact S is operated which is interlocked with the shutter of a camera to be closed for a moment, the first flash lamp $L_1$ is ignited to burn out its filament. Until the burning out of this filament, the voltage across the flash lamp $L_1$ is substantially zero with the result that the emitter and base electrodes of the first transistor $Tr_{11}$ are essentially short circuited so that even when the contact S is closed, the transistor $Tr_{11}$ will be maintained non-conductive, thus preventing any voltage from applying to succeeding flash lamps $L_2$, $L_3$ and $L_4$.

Even when the first flash lamp $L_1$ is ignited and its filament is burnt out to open said short circuit, as the contact has been already opened, succeeding flash lamps could not be ignited.

Under these conditions when the contact S is closed again the first transistor $Tr_{11}$ will become conductive to ignite the second flash lamp $L_2$. Thus, as coupling circuits $K_1$, $K_2$ and $K_3$ are respectively included between adjacent pairs of flash lamps and since these coupling circuits are controlled to become conductive in response to the impedance variation of the circuit of the preceding flash lamp before and after ignition thereof, said impedance variation being caused by the ignition or the burning out of the filament thereof, a series of flash lamps are ignited sequentially.

Figure 7:
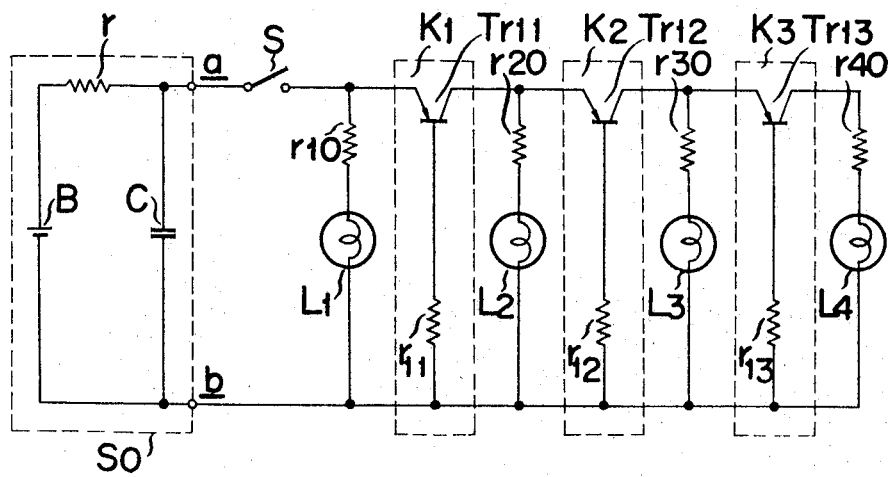

The modification shown in FIG. 7 is identical to that shown in FIG. 6 except that current limiting resistors $R_{10}$, $R_{20}$, $R_{30}$ and $R_{40}$ are respectively connected in series with flash lamps $L_1$, $L_2$, $L_3$ and $L_4$. Corresponding components of these two embodiments are designated by the same reference characters so their description is omitted.

The purpose of providing current limiting resistors $R_{10}$, $R_{20}$, $R_{30}$ and $R_{40}$ is to limit the currents through flash lamps $L_1$ through $L_4$ to the desired values and to assure positive operation of coupling circuits $K_1$ to $K_3$.

Resistors $R_{10}$ through $R_{40}$ may be included in the emitter circuits of transistors $Tr_{11}$ to $Tr_{13}$.

While transistors are utilized in the coupling circuits it is of course to be understood that other semiconductor switching elements, for example, thyristors may also be used. Thus, the invention provides a photo-flashing circuit device for a plurality of flash lamps which utilizes purely electrical static component parts, has a relatively simple circuit construction, can sequentially ignite a number of flash lamps, and can be constructed small enough to be built into a relatively small size camera. Moreover the ignition control device has high resistance to vibrations and shocks, has a long life and excellent reliability.

What we claim is:

1. A circuit for sequentially igniting a plurality of flash lamps for use with a D.C. source and a camera having synchronizing contacts which operate in synchronism with the shutter of said camera to cause ignition of a flash lamp, comprising:
    a capacitor coupled across said D.C. source;
    a plurality of pairs of terminals, a flash lamp being connected between respective pairs of terminals;
    means coupling a first terminal of each of said pairs of terminals through said synchronizing contacts to one terminal of said capacitor;
    means coupling the second terminal of each of said pairs of terminals to the other terminal of said capacitor; and
    current control means including a contactless switching means coupled between first and second pairs of terminals and presenting a higher impedance path between said synchronizing contacts and said second pair of terminals than between said synchronizing contacts and said first pair of terminals, said contactless switching means being responsive to an impedance change between said first pair of terminals after ignition of the flash lamp connected to said first pair of terminals to become conductive to provide a lower impedance current path for ignition of the flash lamp connected to said second pair of terminals during the next operation of said synchronizing contacts.

2. A circuit according to claim 1 wherein said current control means is coupled between adjacent pairs of terminals.

3. A circuit according to claim 1 wherein said current control means includes a plurality of contactless switching means coupled between respective pairs of said terminals.

4. A circuit according to claim 1 wherein said contactless switching means comprises at least one semiconductor switching means.

5. A circuit according to claim 4 wherein said at least one semiconductor switching means includes at least one transistor.

6. A circuit according to claim 5 wherein the collector-emitter path of said transistor is coupled in series with one terminal of said second pair of terminals, said current control means further comprising a resistor coupling the base electrode of said transistor to the corresponding terminal of said first pair of terminals.

7. A circuit according to claim 5 wherein the collector-emitter path of said transistor is coupled between corresponding terminals of said first and second pairs of terminals and the base electrode is coupled to the other terminals of said first and second pairs of terminals.

8. A circuit according to claim 4 wherein said at least one semiconductor switching means comprises:
    first and second transistors;
    a parallel circuit including a first resistor and a capacitor coupled together in parallel;
    means coupling a first end of said parallel circuit to one terminal of said synchronizing contacts;
    means coupling the other end of said parallel circuit to a first terminal of one of said pairs of terminals;
    means coupling the base electrode of said first transistor to the other end of said parallel circuit;
    means coupling the emitter electrode of said first transistor to said first end of said parallel circuit;
    a second resistor coupling the collector electrode of said first transistor to the second terminals of said pairs of terminals;
    means coupling the base electrode of said second transistor to the collector electrode of said first transistor;
    means coupling the emitter electrode of said first transistor to the emitter electrode of said second transistor; and
    means coupling the collector electrode of said second transistor to the next subsequent flash lamp.

9. A circuit according to claim 8 wherein said means coupling the collector electrode of said second transistor to the next subsequent flash lamp includes a second parallel circuit comprising a resistor coupled in parallel with a capacitor.

10. A circuit according to claim 8 wherein said collector electrode of said second transistor is coupled directly to said next subsequent flash lamp, said next subsequent flash lamp being the last flash lamp in said plurality of flash lamps.

References Cited

"Flashbulb Advances From Abroad," by Michael J. Langford, Industrial Photography, July 1961, pp. 15 and 52.

RAYMOND F. HOSSFELD, Primary Examiner

U.S. Cl. X.R.

95—11.5; 240—1.3; 315—228; 431—95